(12) United States Patent
Yahata (10) Patent No.: US 9,384,558 B2
(45) Date of Patent: Jul. 5, 2016

(54) IMAGE PROCESSING DEVICE FOR PERFORMING IMAGE SEGMENTATION PROCESSING

(71) Applicant: CASIO COMPUTER CO., LTD., Shibuya-ku, Tokyo (JP)

(72) Inventor: Takashi Yahata, Hamura (JP)

(73) Assignee: CASI COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/467,632

(22) Filed: Aug. 25, 2014

(65) Prior Publication Data

US 2015/0078663 A1 Mar. 19, 2015

(30) Foreign Application Priority Data

Sep. 18, 2013 (JP) ................................. 2013-193005

(51) Int. Cl.
*G06K 9/34* (2006.01)
*G06T 7/00* (2006.01)
*G06K 9/36* (2006.01)

(52) U.S. Cl.
CPC ............. *G06T 7/0083* (2013.01); *G06T 7/0081* (2013.01); *G06T 7/0097* (2013.01); *G06K 2009/366* (2013.01); *G06T 2200/24* (2013.01); *G06T 2207/10016* (2013.01); *G06T 2207/20144* (2013.01); *G06T 2207/30196* (2013.01)

(58) Field of Classification Search
USPC ................. 382/173, 175, 176, 145, 149, 270; 348/135, 188, 222.1, 218.1, E5.031
See application file for complete search history.

(56) References Cited

U.S. PATENT DOCUMENTS

| | | | | |
|---|---|---|---|---|
| 6,061,476 A | * | 5/2000 | Nichani | 382/270 |
| 6,269,194 B1 | * | 7/2001 | Nichani | 382/270 |
| 6,674,902 B1 | | 1/2004 | Kondo et al. | |
| 6,674,905 B1 | | 1/2004 | Matsugu et al. | |
| 6,721,461 B1 | * | 4/2004 | Nichani | 382/270 |
| 7,076,099 B2 | | 7/2006 | Kondo et al. | |
| 8,792,013 B2 | * | 7/2014 | Levy | 348/222.1 |

FOREIGN PATENT DOCUMENTS

| | | |
|---|---|---|
| JP | 10065923 A | 3/1998 |
| JP | 2000048212 A | 2/2000 |
| JP | 2000339452 A | 12/2000 |
| JP | 2001043381 A | 2/2001 |
| JP | 2013029930 A | 2/2013 |

OTHER PUBLICATIONS

Japanese Office Action dated Dec. 18, 2014, issued in counterpart Japanese Application No. 2013-193005.

* cited by examiner

Primary Examiner — Anh Do
(74) Attorney, Agent, or Firm — Holtz, Holtz & Volek PC (57) ABSTRACT

An image processing device of the present invention acquires the positional information of a boundary line for a case where a first image is segmented into a foreground and a background by a segmentation processing that segments an image into a foreground and a background, and controls the segmentation processing to segment a second image having a predetermined relationship with the first image by use of the positional information of the acquired boundary line.

14 Claims, 6 Drawing Sheets

TOUCH DISPLAY SECTION 6

FIG. 2B

TOUCH DISPLAY SECTION 6

FIG. 2C

TOUCH DISPLAY SECTION 6

FIRST FRAME

CONTOUR OF PHOTOGRAPHIC SUBJECT (RUNNER)

CENTER LINE (IMAGINARY LINE) OF THICK LINE

THICK LINE HAVING PREDETERMINED WIDTH (DRAWN LINE : TRACING OPERATION)

FIG. 4B

BOUNDARY LINE DETERMINED AFTER IMAGE SEGMENTATION PROCESSING

THICK LINE (DRAWING LINE) OF PREDETERMINED WIDTH CREATED ALONG DETERMINED BOUNDARY LINE

SUBSEQUENT FRAME

FIG. 4C

CONTOUR OF PHOTOGRAPHIC SUBJECT (RUNNER)

CENTER LINE (IMAGINARY LINE) OF THICK LINE

THICK LINE (DRAWING LINE) OF PREDETERMINED WIDTH DETERMINED IN PRECEDING FRAME

FIG. 6

IMAGE PROCESSING DEVICE FOR PERFORMING IMAGE SEGMENTATION PROCESSING

CROSS-REFERENCE TO RELATED APPLICATION

This application is based upon and claims the benefit of priority from the prior Japanese Patent Application No. 2013-193005, filed Sep. 18, 2013, the entire contents of which are incorporated herein by reference.

BACKGROUND OF THE INVENTION

1. Field of the Invention

The present invention relates to an image processing device which performs processing for segmenting an area in an image into a plurality of areas.

2. Description of the Related Art

Generally, as a technique for extracting an area (for example, a photographic subject) desired by a user from an image, a technique called image segmentation is known, and there are various methods for this segmentation processing, such as Graph Cuts. However, these methods are based on an assumption that an area (foreground) to be extracted is specified by a user operation, and therefore have a problem in that an area to be extracted is difficult to be precisely specified, and an incorrect specifying operation may create an adverse result in segmentation processing.

For this reason, there is a conventional technique in which, when a point in an extraction target area (photographic subject) in a displayed image is tapped (specified by a user), an area of a predetermined shape (such as a circular shape) including a coordinate point corresponding to the tapped point is created in the image, and pixels in the image are segmented into background pixels and foreground pixels by segmentation processing being performed with the created area as an initial area for the foreground by the use of a program of Graph Cuts (refer to Japanese Patent Application Laid-Open (Kokai) Publication No. 2013-029930).

SUMMARY OF THE INVENTION

In accordance with one aspect of the present invention, there is provided an image processing device comprising: a segmentation processing section which segments an image into a foreground and a background; a boundary position acquisition section which acquires positional information of a boundary line for a case where a first image is segmented into a foreground and a background by the segmentation processing section; and a segmentation control section which controls the segmentation processing section to segment a second image having a predetermined relationship with the first image by use of the positional information of the boundary line acquired by the boundary position acquisition section.

In accordance with another aspect of the present invention, there is provided an image processing method for an image processing device, comprising: a segmentation step of segmenting an image into a foreground and a background; a boundary position acquisition step of acquiring positional information of a boundary line for a case where a first image is segmented into a foreground and a background in the segmentation step; and a segmentation control step of controlling the segmentation step to segment a second image having a predetermined relationship with the first image by use of the positional information of the boundary line acquired in the boundary position acquisition step.

In accordance with another aspect of the present invention, there is provided a non-transitory computer-readable storage medium having stored thereon a program that is executable by a computer, the program being executable by the computer to perform functions comprising: segmentation processing for segmenting an image into a foreground and a background; boundary position acquisition processing for acquiring positional information of a boundary line for a case where a first image is segmented into a foreground and a background in the segmentation processing; and segmentation control processing for controlling the segmentation processing to segment a second image having a predetermined relationship with the first image by use of the positional information of the boundary line acquired in the boundary position acquisition processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereinafter, an embodiment of the present invention will be described with reference to FIG. 1 to FIG. 6.

Figure 1:
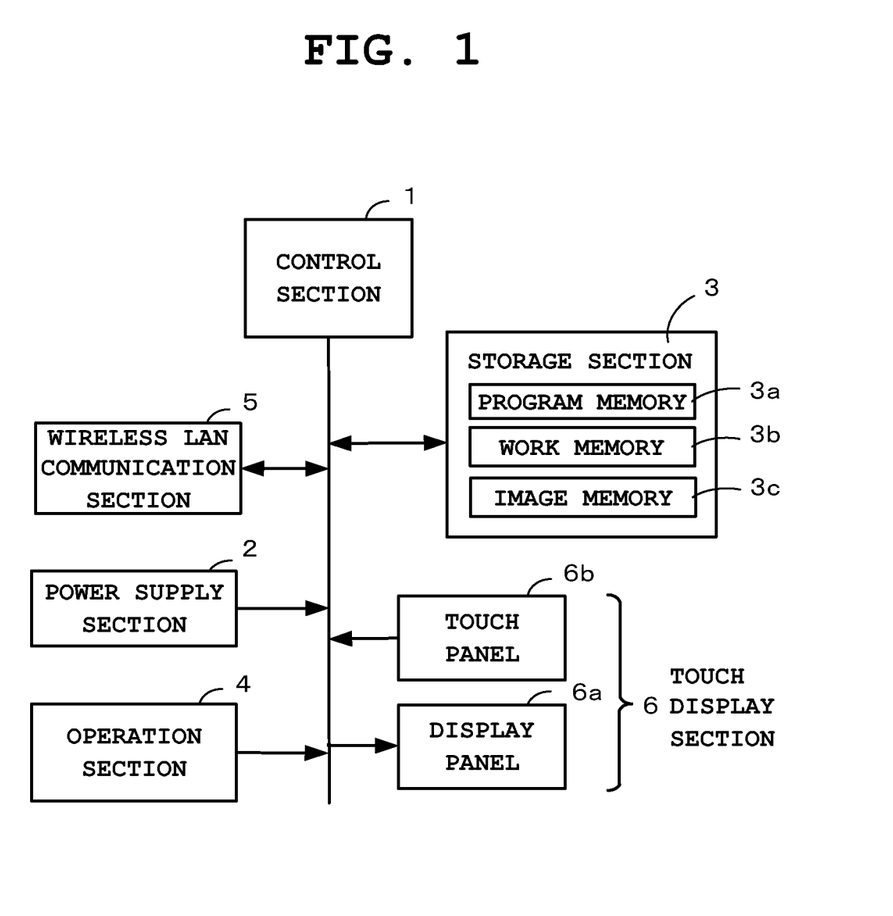
FIG. 1 is a block diagram showing basic components of a tablet terminal device in which the present invention has been applied as an image processing device.

In this embodiment, the present invention has been applied in a tablet terminal device as an image processing device, and FIG. 1 is a block diagram showing basic components of this tablet terminal device.

This tablet terminal device is a portable information terminal device whose housing is of A5 size as a whole, and has a touch input function, a wireless communication function, an Internet connecting function, etc. A control section 1 that serves as the core of this tablet terminal device operates by receiving power from a power supply section (secondary battery) 2. This control section 1 includes a central processing unit that controls the entire operation of the tablet terminal device according to various programs in a storage section 3, a memory, etc.

Figure 5:
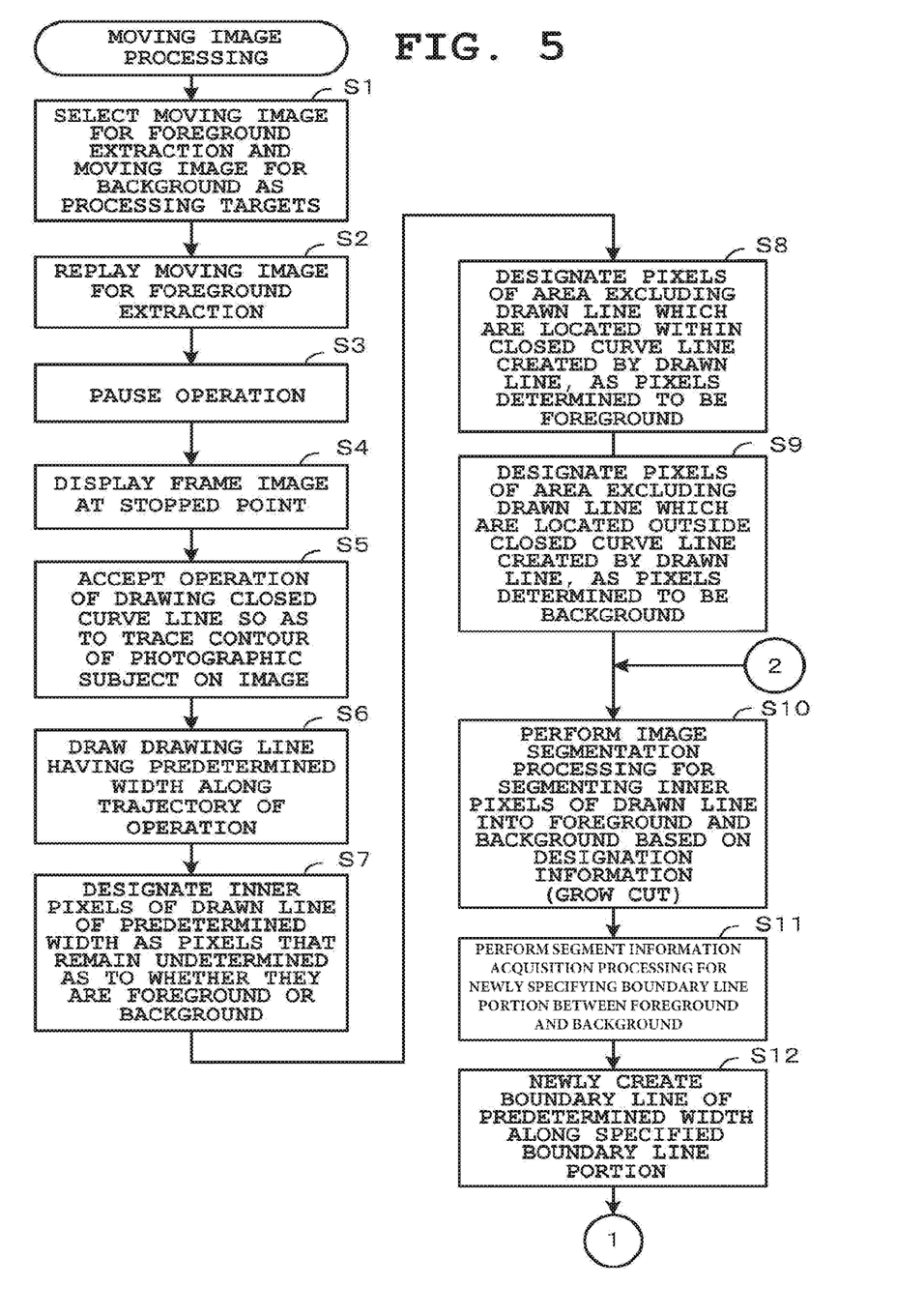
FIG. 5 is a flowchart of moving image processing for extracting a photographic subject (marathon runner) from a moving image as a foreground, and combining the photographic subject with another moving image.
Figure 6:
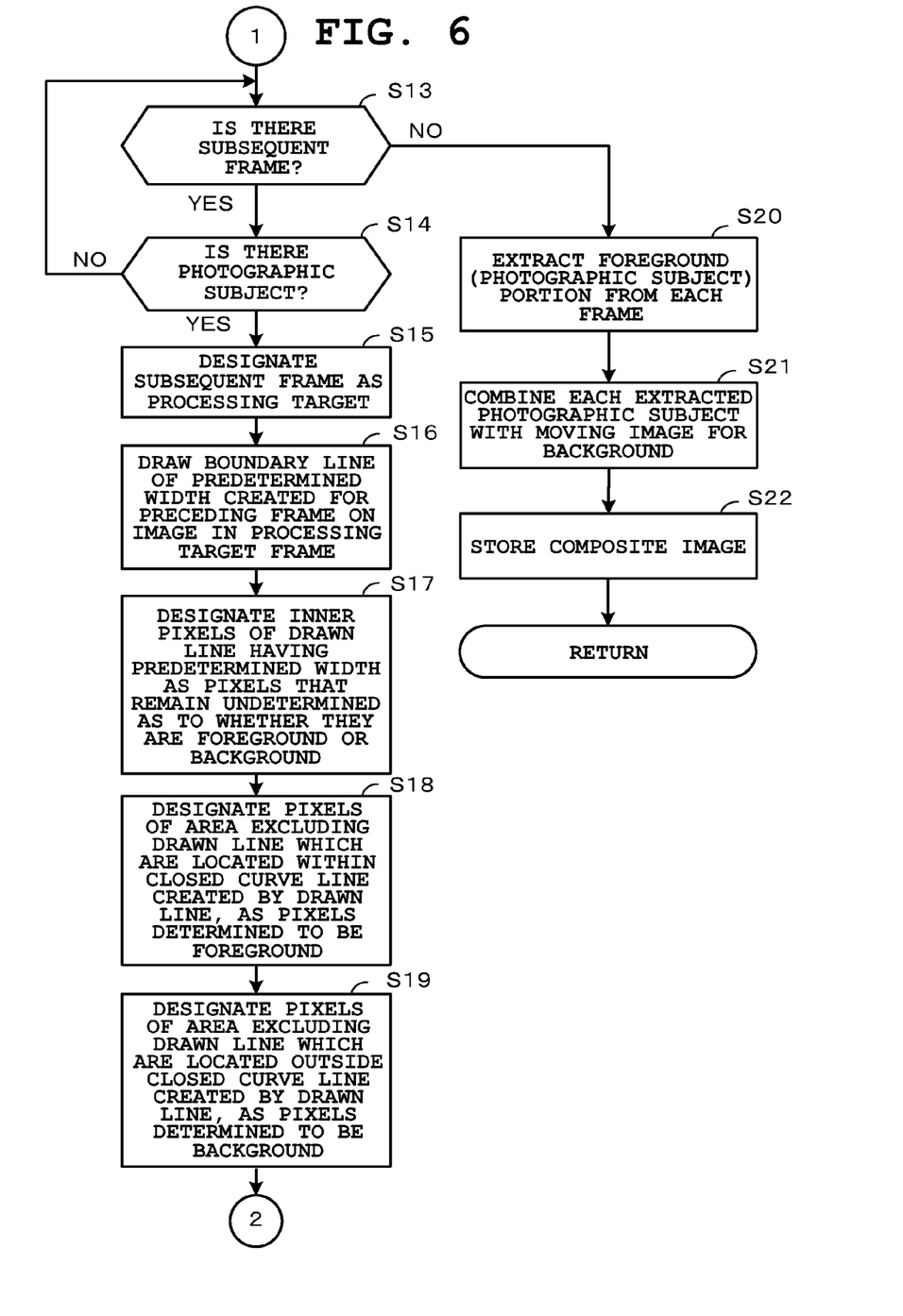
FIG. 6 is a flowchart of operations following those in FIG. 5.

The storage section 3 is structured to include a ROM (Read-Only Memory), a flash memory, and the like, and has a program memory 3a having stored therein programs for achieving the present embodiment according to operation procedures shown in FIG. 5 and FIG. 6, a work memory 3b that temporarily stores various data and flags required in this tablet terminal device, and an image memory 3c that stores various image data such as a moving image captured by a camera function. Note that the storage section 3 may be structured to include, for example, a removable portable memory (recording medium) such as an SD card or IC card. In addition, although not shown, the storage section 3 may include a storage area on a predetermined server device side in a case where the tablet terminal device is connected to a network via a communication function. Also, the image memory 3c is not limited to an internal memory and may be a removable portable memory such as an SD card. This memory 3c stores, for example, image data received and acquired via the Internet or image data captured by a camera device (not shown).

An operation section 4 in FIG. 1 includes a power supply key for turning power supply ON/OFF, a selection key for selecting a moving image to be processed, a playback key for instructing to replay a moving image, a pause key for instructing to temporarily stop a moving image being replayed, and the like not shown, as push-button-type keys. A wireless LAN (Local Area Network) communication section 5 in FIG. 1 is a wireless communication module capable of high-speed large-capacity communication, and is connectable to the Internet or the like via a wireless LAN router nearby (omitted in the drawing). A touch display section 6 in FIG. 1 is structured by a touch panel 6b being laminated on a display panel 6a, and displays function names serving as software keys (soft keys), various icons, and image data. The touch panel 6b of the touch display section 6 constitutes a touch screen which detects a point where a touch operation has been performed with a finger or the like (including an operator such as a pen) and inputs coordinate data of the point. Note that, although a capacitive type or a resistive film type is adopted in this embodiment, another type such as a photosensor type may be adopted.

Figure 2A:
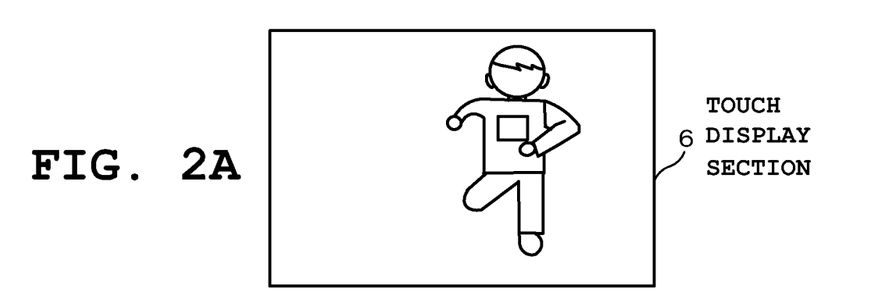
FIG. 2A to FIG. 2C are diagrams exemplarily showing a state where moving image data read out from an image memory 3c are being replayed on the touch display section 6.
Figure 2B:
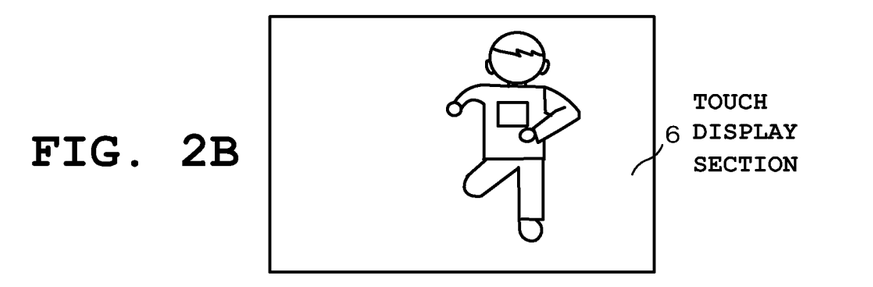
Figure 2C:
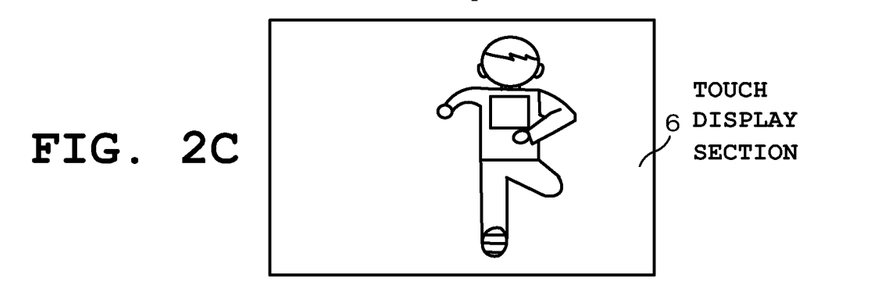

FIG. 2A to FIG. 2C are diagrams exemplarily showing a state where moving image data read out from the image memory 3c are being replayed on the touch display section 6.

Moving images to be replayed by the touch display section 6 are, for example, moving images of data acquired by capturing a moving subject (for example, a marathon runner), and the frame rates of which are 30 fps. Note that the frame rates are not limited to 30 fps and may be arbitrarily set. FIG. 2A shows a frame image captured at timing at which the left foot of a marathon runner has landed on the ground (left-foot-landing image), and FIG. 2B shows the subsequent frame image, which is substantially the same as the preceding frame image showing the left foot landing in FIG. 2A. That is, the image in FIG. 2B is substantially the same as the image showing the left foot landing in FIG. 2A except for a change due to the movement of the moving subject (for example, a marathon runner) for one frame. FIG. 2C shows a frame image displayed, for example, 15 frames (½ second) after the frame image of the left foot landing in FIG. 2, which is an image captured at timing at which the right foot of the marathon runner has landed on the ground (right-foot-landing image).

In the moving image processing of the present embodiment, from each frame image of a moving image where a marathon runner is a subject as described above, the area of the subject (marathon runner) is extracted as a foreground, and this subject is combined with another moving image. However, the moving image processing is not limited thereto and may be performed in an arbitrary manner.

Figure 3A:
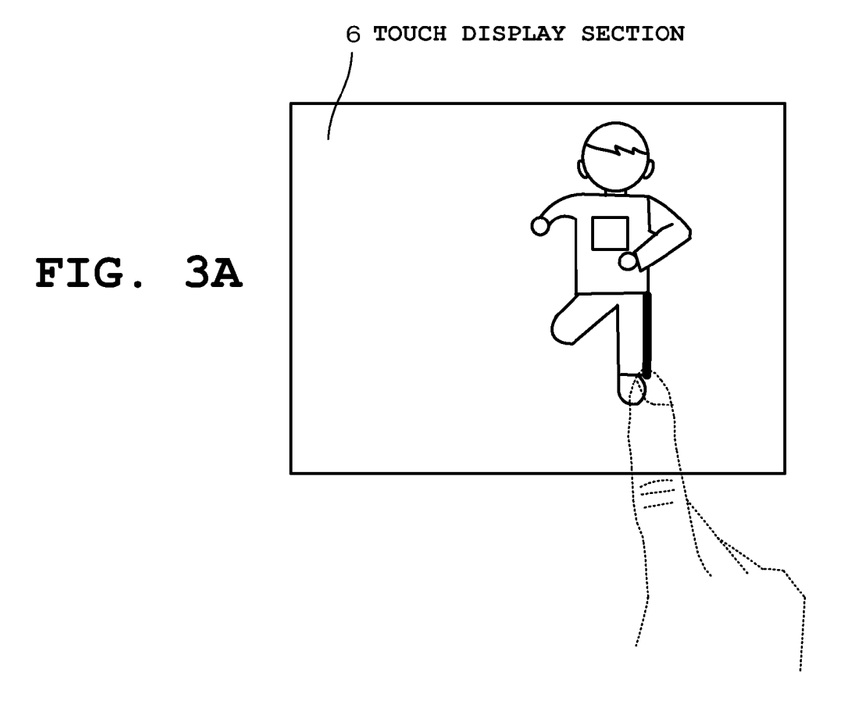
FIG. 3A to FIG. 3B are diagrams for explaining preprocessing that is performed before a photographic subject (marathon runner) is extracted from a moving image as a foreground.
Figure 3B:
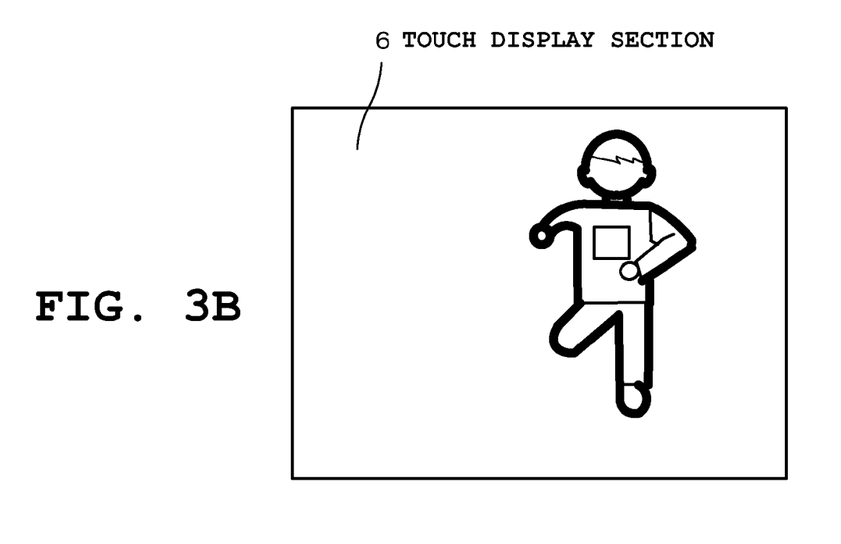

FIG. 3A to FIG. 3B are diagrams for explaining preprocessing which is performed before a photographic subject (marathon runner) is extracted from a moving image as a foreground and in which the area of the photographic subject (marathon runner) is specified by a user operation from within a first frame image showing the photographic subject. FIG. 3A shows a state where the contour of the photographic subject is being "traced" by a user operation so that the area of the photographic subject (marathon runner) in the image is specified.

That is, when the moving image of running marathon runners is being replayed on the touch display section 6, if the playback of the moving image is temporarily stopped at a frame showing a desired marathon runner, and the contour (outline: closed curve) of the marathon runner is traced with a finger or a pen tip by a touch operation so as to designate the area of the marathon runner as a foreground, a thick line having a predetermined width is drawn on "the portion traced" by "this tracing operation" (substantially on the contour of the marathon runner). The width (thickness) of this drawn line is, for example, several pixels to several tens of pixels, which varies depending on the display screen size, the resolution, and the moving image frame rate. FIG. 3B shows a state where the contour of the marathon runner has been "traced", or in other words, surrounded by the drawn line having the predetermined width (a state where a closed curve line has been drawn). This portion serves as a thick line area corresponding to the photographic subject.

Figure 4A:
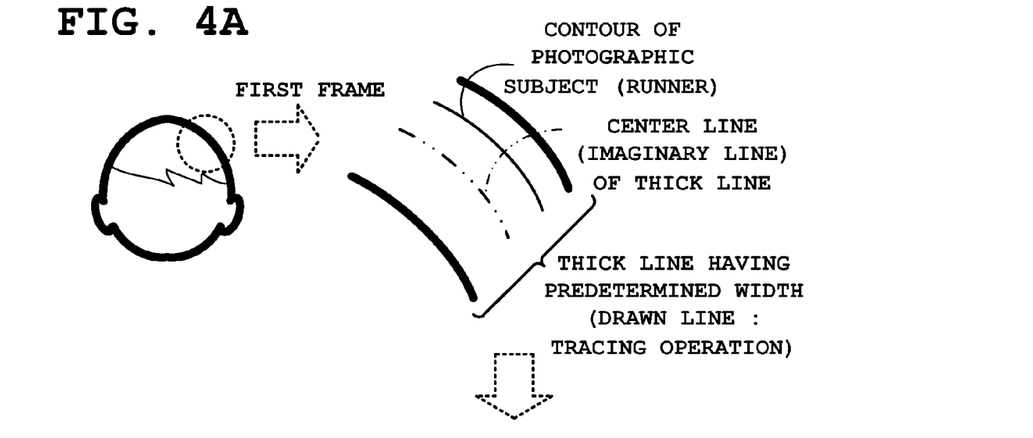
FIG. 4A to FIG. 4C are diagrams for explaining processing for identifying the area of a photographic subject (marathon runner) for each frame of a moving image so as to extract the photographic subject from each frame image as a foreground.
Figure 4B:
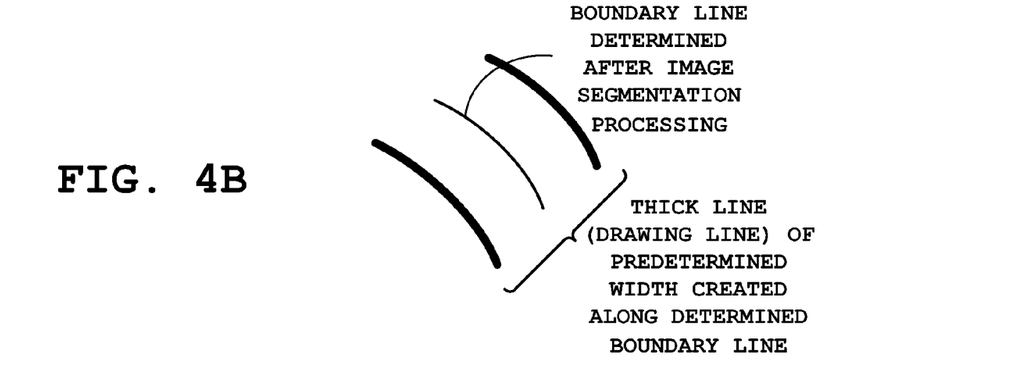
Figure 4C:
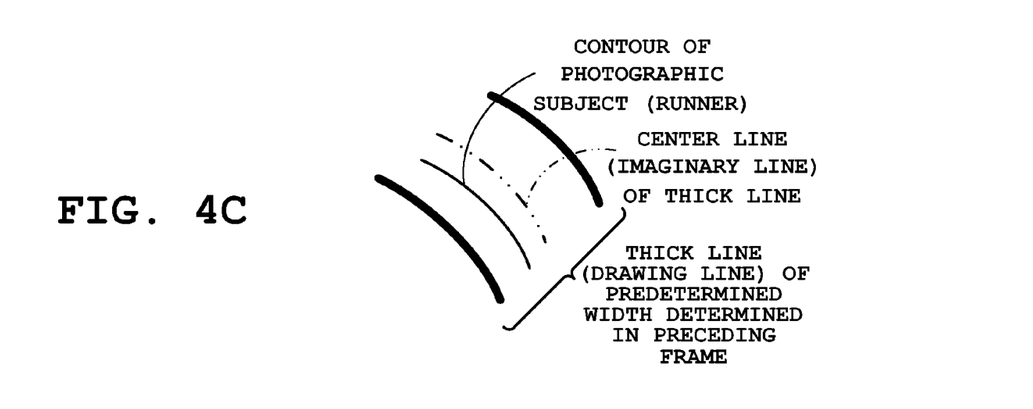

FIG. 4A to FIG. 4C are diagrams for explaining processing for identifying the area of a photographic subject (marathon runner) for each frame of a moving image so as to extract the photographic subject from each frame image as a foreground.

FIG. 4A is a diagram showing a state where a thick line having a predetermined width has been drawn by the contour of the photographic subject being "traced" in a first frame image as described above. Here, when the contour of the photographic subject in the frame image is being traced by a user operation, the contour of the photographic subject, that is, the boundary line between the foreground pixels and the background pixels is likely to be located at a position shifted from the center line (imaginary line) of the drawn line having the predetermined width, depending on the preciseness of the tracing operation. However, in the present embodiment, even in a case where the contour of the photographic subject has not been precisely traced (even in a case where the tracing operation has been performed roughly) when the drawing line is being specified, the drawn line is judged as a valid line as long as the contour of the photographic subject is within the area of the drawn line having the predetermined width, and predetermined image segmentation processing is performed based on this drawn line. That is, the drawing line for the predetermined image segmentation processing may be specified roughly.

This predetermined image division processing is processing for segmenting the pixels of a whole image into foreground pixels and background pixels based on the positional information of some of the foreground pixels and the background pixels specified in the image, in which a segmentation method called Grow Cut is used. In this processing, an image is segmented into foreground pixels and background pixels, with one side of an area segmented by a specified and drawn line having a predetermined width as the positional information of some of the foreground pixels, the other side thereof as the positional information of some of the background pixels, and the inner pixels of this drawn line having the predetermined width as pixels that remain undetermined as to whether they are a foreground or a background.

FIG. 4B is a diagram showing a new boundary line created based on the foreground pixels and the background pixels determined by the image segmentation processing being performed on the first frame as described above, and a thick line (drawing line) of a predetermined width created based on this boundary line. That is, FIG. 4B is showing a state where a new boundary line has been created based on foreground pixels and background pixels newly determined by image segmentation processing for segmenting pixels into foreground pixels and background pixels being performed on the inner pixels of the drawn line of the predetermined width which remain undetermined as to whether they are a foreground or a background, and a thick line having a predetermined width has been created and drawn along this boundary line.

FIG. 4C is a diagram showing a state where the drawn line in the preceding frame image has been applied in a corresponding area in the following frame image. That is, FIG. 4C is showing a state where the drawing line of the predetermined width newly created in FIG. 4B has been applied in a corresponding area (identical area) in the following frame, in which the contour of the photographic subject is located at a position shifted from the center line (imaginary line) of the drawing line having the predetermined width. Here, as in the above-described case, image segmentation processing for segmenting pixels into foreground pixels and background pixels is performed on the whole image with the inner pixels of the drawing line as pixels that remain undetermined as to whether they are a foreground or a background, whereby a boundary line between the foreground pixels and the background pixels is newly determined. In addition, processing for drawing and creating a thick line having a predetermined width along the boundary line is performed. Then, this new boundary line is applied in the following frame. Hereafter, the above-described operations are repeatedly performed for each frame.

As described above, in the present embodiment, an image processing device (tablet terminal device) is structured to include a segmentation processing section (the control section 1 and the program memory 3a) which performs predetermined image segmentation processing for segmenting the pixels of a whole image into foreground pixels and background pixels based on the positional information of some of the foreground pixels and the positional information of some of the background pixels specified in the image, a specifying section (the control section 1, the program memory 3a, and the touch display section 6) which specifies a drawing line having a predetermined width (several pixels to several tens of pixels) on the image to be subjected to the image segmentation processing by the division processing means, and a segmentation processing control section (the control section 1 and the program memory 3a) which controls the predetermined image segmentation processing to be performed on the image, with one side of an area segmented by the drawing line of the predetermined width specified by the specifying section as the positional information of some of the foreground pixels, the other side of the area as the positional information of some of the background pixels, and the inner pixels of the drawing line of the predetermined width as pixels that remain undetermined as to whether the pixels are a foreground or a background.

Next, the operation concept of the image processing device (tablet terminal device) of the present embodiment is described with reference to flowcharts shown in FIG. 5 and FIG. 6. Here, each function described in the flowcharts is stored in a readable program code format, and operations based on these program codes are sequentially performed. Also, operations based on the above-described program codes transmitted over a transmission medium such as a network can also be sequentially performed. That is, the unique operations of the present embodiment can be performed using programs and data supplied from an outside source over a transmission medium, in addition to a recording medium. Note that these flowcharts in FIG. 5 and FIG. 6 outline operations of the characteristic portion of the present embodiment from among all of the operations of the tablet terminal device. After exiting the flows in FIG. 5 and FIG. 6, the procedure returns to the main flow (not shown) of the overall operation.

FIG. 5 and FIG. 6 are flowcharts of moving image processing for combining a photographic subject (marathon runner) extracted from a moving image with another moving image, which is an operation of the characteristic portion of the present embodiment.

First, when a selection operation for respectively selecting a moving image for foreground extraction and a moving image for a background as processing targets from a list screen showing an image list is performed (Step S1 of FIG. 5), the control section 1 starts a playback operation for reading out the selected moving image data for foreground extraction and displaying it on the touch display section 6 (Step S2). In this state, if a pause operation for instructing to temporarily stop the playback is performed when a desired photographic subject (marathon runner) appears in the playback screen (Step S3), the control section 1 temporarily stops the playback operation and causes a frame image at this stopped point to be displayed in a stopped state (Step S4). Then, the control section 1 switches the current state to a state where a tracing operation (operation for drawing a closed curve line) can be accepted to be performed on the displayed frame image (touch screen) (Step S5).

Here, when the contour (outline: closed curve) of the photographic subject (marathon runner) is "traced" with a finger or a pen tip by a touch operation, a thick drawing line having a predetermined width is displayed on the "traced portion" along the trajectory of the operation, as shown in FIGS. 3A and 3B (Step S6). In a case where the trajectory of the tracing operation is straying far from the contour of the photographic subject by a distance greater than the predetermined width of the thick line, a notification indicating this situation may be provided to the user by a message being displayed.

Then, when the whole contour of the photographic subject is "traced" by the touch operation, the control section 1 proceeds to the following Step S7, and designates the inner pixels of the drawn line of the predetermined width as pixels that remain undetermined as to whether they are a foreground or a background.

Next, the control section 1 designates, as pixels determined to be a foreground, pixels of an area excluding the drawn line which are located within the closed curve line created by the drawn line (Step S8). In addition, the control section 1 designates, as pixels determined to be a background, pixels of an area excluding the drawn line which are located outside the closed curve line created by the drawn line (Step S9). Then, the control section 1 performs image segmentation processing for segmenting the inner pixels of the drawn line into foreground pixels and background pixels based on designation information regarding the designated foreground and background (Step S10).

In the image segmentation processing of this embodiment (Step S10), the initially designated foreground pixels and background pixels are taken as determined pixels for which determination as to whether they are a foreground or a background has been completed. For the target pixels (the inner pixels of the drawn line) that remain undetermined as to whether they are a foreground or a background, processing for improving a confidence level as to whether a target pixel is a foreground or a background is repeated based on the information of a surrounding pixel located around the target pixel and having a higher confidence level as to whether it is a foreground or a background as compared to that of the target pixel, and eventually the determination of all of the target pixels as to whether they are a foreground or a background is completed. That is, when surrounding pixels whose confidence levels as to whether they are a foreground or a background are higher than those of the target pixels are present around the target pixels (the inner pixels of the drawn line) that remain undetermined as to whether they are a foreground or a background, and the pixel values of the target pixels and the pixel values of the surrounding pixels are close in distance, processing is repeated in which the label of a target pixel indicating whether it is a foreground or a background is changed to the same label as that of a surrounding pixel and the confidence level of the target pixel is changed based on the confidence level of the surrounding pixel and the distance, and eventually the determination of all of the target pixels as to whether they are a foreground or a background is completed.

When the determination of the inner pixels of the drawn line as to whether they are a foreground or a background is completed for all of the inner pixels, the control section 1 newly specifies, based on the determined foreground and the determined background, a boundary line portion (a boundary line) between the foreground and the background, as shown in FIG. 4B (Step S11), and newly creates a thick drawing line of a predetermined width along the specified boundary line portion (boundary line) (Step S12). Then, the control section 1 proceeds to the flow of FIG. 6, and judges whether there is a subsequent frame (Step S13). When judged that there is a subsequent frame (YES at Step S13), the control section 1 judges whether there is the photographic subject (marathon runner) in a corresponding area in this frame (Step S14).

When judged that there is the photographic subject in a corresponding area in the frame (YES at Step S14), the control section 1 designates this frame image as a processing target (Step S15), and after performing processing in which the drawing line of the predetermined width created for the preceding frame (the immediately preceding frame) is drawn in the corresponding area in the designated processing target frame (Step S16), designates the inner pixels of this drawn line having the predetermined width as pixels that remain undetermined as to whether they are a foreground or a background (Step S17), as shown in FIG. 4C. Next, the control section 1 designates, as pixels determined to be a foreground, pixels of an area excluding the drawn line which are located within a closed curve line created by the drawn line (Step S18). In addition, the control section 1 designates, as pixels determined to be a background, pixels of an area excluding the drawn line which are located outside the closed curve line created by the drawn line (Step S19). Then, the control section 1 returns to Step S10 in FIG. 5 and performs image segmentation processing for segmenting the inner pixels of the drawn line into foreground pixels and background pixels. Hereafter, until a judgment is made at Step S13 that there is no subsequent frame, the above-described operations are repeated.

At Step S13, when judged that there is no subsequent frame (NO at Step S13), the control section 1 performs predetermined moving image processing based on a result of the segmentation into a foreground and a background (Steps S20 to S22). That is, the control section 1 performs processing for extracting the foreground portion (marathon runner) from each frame of the moving image for foreground extraction (Step S20), reading out the selected moving image for the background, combining the extracted foreground portion (marathon runner) with the moving image for the background (Step S21), and storing the composite image (moving image) (Step S22).

As described above, in the present embodiment, the control section 1 performs predetermined image segmentation processing for segmenting the pixels of a whole image into foreground pixels and background pixels based on the positional information of some of the foreground pixels and the positional information of some of the background pixels specified in the image, with one side of an area segmented by a drawing line of a predetermined width specified in the image that is a image segmentation processing target as the positional information of some of the foreground pixels, the other side the area as the positional information of some of the background pixels, and the inner pixels of the drawing line having the predetermined width as pixels that remain undetermined as to whether they are a foreground or a background. As a result of this configuration, the entire processing for segmenting the pixels of an image into background pixels and foreground pixels can be simplified as compared to, for example, a method in which a boundary line is pursued from the amount of characteristics such as the colors and edges of pixels constituting the boundary line. In addition, when a drawing line having a predetermined width is to be specified, it can be specified roughly by an amount equal to the predetermined width. That is, image segmentation can be precisely performed with a simple specifying operation by the user.

Also, when an image among two sequentially captured images has been entirely segmented into foreground pixels and background pixels by image segmentation processing, the control section 1 newly creates a drawing line of a predetermined width along a boundary line between the foreground pixels and the background pixels in the image, and applies this new drawing line in a corresponding area in the other image. As a result of this configuration, when sequentially captured images are to be sequentially segmented into a foreground and a background, a drawn line of a predetermined width can be reused, by which the entire processing can be simplified.

In this case, since the sequentially captured images are a moving image constituted by plurality of frames, the entire processing can be significantly simplified. In addition, by merely performing an operation of roughly tracing the contour of a photographic subject in a first frame image, the user can extract the photographic subject as a foreground from each of the subsequent frame images. Therefore, the drawing operation is not required to be performed on all of the frame images, which significantly simplify the user's operation.

Moreover, in the predetermined image segmentation processing, foreground pixels and background pixels initially designated are taken as determined pixels for which determination as to whether they are a foreground or a background has been completed. For target pixels that remain undetermined as to whether they are a foreground or a background, processing for improving a confidence level as to whether a target pixel is a foreground or a background is repeated based on the information of a surrounding pixel located around the target pixel and having a higher confidence level as to whether it is a foreground or a background as compared to that of the target pixel, and eventually the determination of all of the target pixels as to whether they are a foreground or a background is completed. As a result of this configuration, the entire processing for segmenting pixels in an image into background pixels and foreground pixels can be simplified.

In this case, when surrounding pixels whose confidence levels as to whether they are a foreground or a background are higher than those of target pixels are present around the target pixels that remain undetermined as to whether they are a foreground or a background, and the pixel values of the target pixels and the pixel values of the surrounding pixels are close in distance, processing is repeated in which the label of a target pixel indicating whether it is a foreground or a background is changed to the same label as that of a surrounding pixel and the confidence level of the target pixel is changed based on the confidence level of the surrounding pixel and the distance, and eventually the determination of all of the target pixels as to whether they are a foreground or a background is completed. As a result of this configuration, a confidence level as to whether pixels are a foreground or a background can be accurately determined.

In the above-described embodiment, the present invention is used for moving image data. However, a configuration is also possible in which pixels in a plurality of sequentially (consecutively) captured images are segmented into background pixels and foreground pixels. In this case, the predetermined width of the drawing line is changed in accordance with the speed of the consecutive capturing. For example, the predetermined width of the drawing line may become thicker as the speed of the consecutive capturing slows down.

Also, in the above-described embodiment, an inner area surrounded by a drawing line (closed curve line) of a predetermined width is extracted as a foreground, and an area outside the line is extracted as a background. However, a configuration may be adopted in which the area outside the drawing line (closed curve line) of the predetermined width is extracted as a foreground, and the inner area is extracted as a background.

Moreover, in the above-described embodiment, pixels in an image are segmented into "background pixels" and "foreground pixels". However, these expressions "background pixels" and "foreground pixels" are expressions for descriptive purposes, and the present invention is not limited to the case where segmentation is performed with an area excluding a photographic subject as a background and the photographic subject as a foreground. In a case where an area in an image is segmented into the area of photographic subject A and the area of photographic subject B, one may be "background pixels" and the other may be "foreground pixels".

Furthermore, in the above-described embodiment, the segmentation method called Grow Cut is used as the predetermined image segmentation processing. However, other segmentation methods may also be used.

Still further, in the above-described embodiment, the moving image processing is performed in which a photographic subject (marathon runner) is extracted as a foreground from each frame image of a moving image where the photographic subject is a marathon runner, and combined with another moving image. However, processing may be performed in which a photographic subject is cut out as a foreground, and the portion from which the photographic subject has been cut out is covered with a background.

Yet still further, in the above-described embodiment, the present invention has been applied to a tablet terminal device as an image processing device. However, the present invention is not limited thereto, and may be applied to a personal computer, a PDA (Personal Digital Assistant), a cellular phone such as a smart phone, a game machine, a music player, or a digital camera itself.

Yet still further, in the above-described embodiment, each function (section) is actualized by each program stored in the program memory $3a$ being executed by the control section 1. However, dedicated circuit blocks for the respective functions (sections) may be provided.

In this case, the image processing device may be constituted by a segmentation processing section which segments an image into a foreground and a background; a boundary position acquisition section which acquires the positional information of a boundary line for a case where a first image is segmented into a foreground and a background by the segmentation processing section; and a segmentation control section which controls the segmentation processing section to segment a second image having a predetermined relationship with the first image by use of the positional information of the boundary line acquired by the boundary position acquisition section.

Also, a configuration may be adopted in which the segmentation processing section segments the pixels of the whole image into foreground pixels and background pixels by use of the positional information of a temporary boundary line specified on the image, and the segmentation control section specifies a temporary boundary line on the second image based on the positional information of the boundary line acquired with the first image as a target by the boundary position acquisition section, and controls the segmentation processing section to segment the second image.

Moreover, a configuration may be adopted in which a specification section is provided which specifies a boundary line by a user operation performed on the image, and the segmentation control section designates, as a temporary boundary line on the first image, a boundary line specified with the first image as a target by the specification section, and controls the segmentation processing section to segment the first image.

Furthermore, a configuration may be adopted in which the specification section creates and displays a drawing line having a predetermined width by a drawing operation performed on the image by the user, and designates the created drawing line of the predetermined width as the temporary boundary line.

Still further, a configuration may be adopted in which the segmentation processing section performs predetermined image segmentation processing for segmenting the pixels of the whole image into foreground pixels and background pixels by use of the positional information of some of the foreground pixels or the background pixels specified in the image; and the segmentation control section designates pixels located at a predetermined distance away from the boundary line as some of the foreground pixels or the background pixels described above, and then controls the segmentation processing section to perform the image segmentation.

Yet still further, a configuration may be adopted in which the segmentation processing section performs predetermined image segmentation processing for segmenting the pixels of the whole image into foreground pixels and background pixels by use of the positional information of some of the foreground pixels and the background pixels specified in the image; and the segmentation control section controls the segmentation processing section to perform the image segmentation, with pixels located at the predetermined distance away on one side of an area segmented by the boundary line as some of the foreground pixels described above, pixels located at the predetermined distance away on the other side of the area segmented by the boundary line as some of the background pixels described above, and pixels located within the predetermined distance from the boundary line as pixels that remain undetermined as to whether they are a foreground or a background.

Yet still further, a configuration may be adopted in which an image acquisition section is further provided which acquires, as the first image and the second image, two captured images showing the same photographic subject.

Yet still further, a configuration may be adopted in which an image acquisition section is further provided which acquires two sequentially captured images as the first image and the second image.

Yet still further, a configuration may be adopted in which the image acquisition section sequentially acquires, as the first image and the second image, two sequentially captured images from among a plurality of frame images included in moving image data; the boundary position acquisition section sequentially acquires the positional information of a boundary line when sequential segmentation is performed by the segmentation processing section with each frame image sequentially acquired by the image acquisition section as a target: and the segmentation control section controls the segmentation processing section to sequentially perform segmentation by use of the positional information of the boundary line sequentially acquired by the boundary position acquisition section with each frame image sequentially acquired by the image acquisition section as a target.

Yet still further, a configuration may be adopted in which the segmentation control section controls such that a boundary line for a first frame image to be segmented by the segmentation processing section from among the plurality of frame images included in the moving image data is specified by a user operation on the image.

Yet still further, a configuration may be adopted in which the segmentation processing section performs predetermined image segmentation processing for taking initially designated foreground pixels and background pixels as determined pixels for which determination as to whether they are a foreground or a background has been completed; and repeating, for target pixels that remain undetermined as to whether they are a foreground or a background, processing for improving a confidence level as to whether a target pixel is a foreground or a background based on the information of a surrounding pixel located around the target pixel and having a higher confidence level as to whether it is a foreground or a background as compared to that of the target pixel, so that the determination of all of the target pixels as to whether they are a foreground or a background is eventually completed.

Yet still further, a configuration may be adopted in which the segmentation processing section performs predetermined image segmentation processing for repeating, when the surrounding pixels whose confidence levels as to whether they are a foreground or a background are higher than those of the target pixels are present around the target pixels that remain undetermined as to whether they are a foreground or a background, and the pixel values of the target pixels and the pixel values of the surrounding pixels are close in distance, processing in which the label of a target pixel indicating whether it is a foreground or a background is changed to the same label as that of a surrounding pixel and the confidence level of the target pixel is changed based on the confidence level of the surrounding pixel and the distance, so that the determination of all of the target pixels as to whether they are a foreground or a background is eventually completed.

Yet still further, the "devices" or the "sections" described in the above-described embodiment are not required to be in a single housing and may be separated into a plurality of housings by function. In addition, the steps in the above-described flowcharts are not required to be processed in time-series, and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. An image processing device comprising:
a processor which executes a program to perform processing including:
segmentation processing which, when foreground pixels determined to be a foreground, background pixels determined to be a background, and undetermined pixels that remain undetermined as to whether they are a foreground or a background are designated in an image, further segments the undetermined pixels into foreground pixels and background pixels based on designation information;
segment information acquisition processing which acquires segment information that is information for a case in which a first image is segmented into foreground pixels and background pixels by the segmentation processing; and
segmentation control processing which, when controlling the segmentation processing to segment a second image having a predetermined relationship with the first image, specifies foreground pixels, background pixels, and undetermined pixels of the second image in the image, by using the segment information acquired by the segment information acquisition processing,
wherein the segmentation control processing determines an area in which a predetermined width in accordance with the relationship between the first image and the second image is provided for a boundary line between the foreground pixels and the background pixels determined by the segment information, specifies an area in the second image corresponding to the determined area as undetermined pixels, and controls the segmentation processing to segment the second image.

2. The image processing device according to claim 1, wherein the segmentation control processing specifies such that a width of the area corresponding to the undetermined pixels becomes thicker as the relationship between the first image and the second image is lower, and controls the segmentation processing to segment the second image.

3. The image processing device according to claim 2, wherein the segmentation control processing specifies such that the width of the area corresponding to the undetermined pixels becomes thicker as a difference between a time when the first image is captured and a time when the second image is captured is larger, and controls the segmentation processing to segment the second image.

4. The image processing device according to claim 3, wherein the segmentation control processing creates and displays a drawing line having a predetermined width by a drawing operation performed on the image by a user, and designates the created drawing line of the predetermined width as the boundary line.

5. The image processing device according to claim 1, wherein the segmentation processing performs predetermined image segmentation processing for segmenting pixels of the whole image into foreground pixels and background pixels by using positional information of some of the foreground pixels or the background pixels specified in the image, and wherein the segmentation control processing designates pixels located at a predetermined distance away from the boundary line as some of the foreground pixels or the background pixels, and controls the segmentation processing to segment the image.

6. The image processing device according to claim 5, wherein the segmentation processing performs predetermined image segmentation processing for segmenting pixels of the whole image into foreground pixels and background pixels by using positional information of some of the foreground pixels and the background pixels specified in the image, and wherein the segmentation control processing controls the segmentation processing to segment the image, with pixels located at the predetermined distance away on one side of an area segmented by the boundary line as the positional information of some of the foreground pixels, pixels located at the predetermined distance away on another side of the area segmented by the boundary line as the positional information of some of the background pixels, and pixels located within the predetermined distance from the boundary line as pixels that remain undetermined as to whether the pixels are a foreground or a background.

7. The image processing device according to claim 1, wherein the processor further performs image acquisition processing which acquires, as the first image and the second image, two captured images showing a same photographic subject.

8. The image processing device according to claim 1, wherein the processor further performs image acquisition processing which acquires two sequentially captured images as the first image and the second image, wherein the segmentation control processing specifies such that a width of the area corresponding to the undetermined pixels becomes thicker as a speed of the sequentially capturing slows down, and controls the segmentation processing to segment the second image.

9. The image processing device according to claim 8, wherein the image acquisition processing sequentially acquires, as the first image and the second image, two sequentially captured images from among a plurality of frame images included in moving image data captured by the image acquisition device, wherein the segment information acquisition processing sequentially acquires positional information of a boundary line when sequential segmentation is performed by the segmentation processing with each frame image sequentially acquired by the image acquisition processing as a target, and wherein the segmentation control processing controls the segmentation processing to sequentially perform segmentation by using the positional information of the boundary line sequentially acquired by the segment information acquisition processing with each frame image sequentially acquired by the image acquisition processing as a target.

10. The image processing device according to claim 9, wherein the segmentation control processing controls such that a boundary line for a first frame image to be segmented by the segmentation processing from among the plurality of frame images included in the moving image data is specified by a user operation performed on the image.

11. The image processing device according to claim 1, wherein the segmentation processing performs predetermined image segmentation processing for (i) taking initially designated foreground pixels and background pixels as determined pixels for which determination as to whether pixels are a foreground or a background has been completed, (ii) and repeating, for target pixels that remain undetermined as to whether the target pixels are a foreground or a background, processing for improving a confidence level as to whether a target pixel is a foreground or a background based on information of a surrounding pixel located around the target pixel and having a higher confidence level as to whether the surrounding pixel is a foreground or a background as compared to a confidence level related to the target pixel, so that determination of all of the target pixels as to whether the target pixels are a foreground or a background is eventually completed.

12. The image processing device according to claim 11, wherein the segmentation processing performs predetermined image segmentation processing in which, when surrounding pixels whose confidence levels as to whether the surrounding pixels are a foreground or a background are higher than confidence levels of the target pixels are present around the target pixels that remain undetermined as to whether the target pixels are a foreground or a background, and pixel values of the target pixels and pixel values of the surrounding pixels are close in distance, processing is repeated in which a label of a target pixel indicating whether the target pixel is a foreground or a background is changed to a same label as a label of a surrounding pixel and a confidence level of the target pixel is changed based on a confidence level of the surrounding pixel and the distance, so that determination of all of the target pixels as to whether the target pixels are a foreground or a background is eventually completed.

13. An image processing method for an image processing device, comprising:

segmentation processing for, when foreground pixels determined to be a foreground, background pixels determined to be a background, and undetermined pixels that remain undetermined as to whether they are a foreground or a background are designated in an image, further segmenting the undetermined pixels into foreground pixels and background pixels based on designation information;

segment information acquisition processing for acquiring segment information for a case in which a first image is segmented into foreground pixels and background pixels in the segmentation processing; and segmentation control processing for, when controlling the segmentation processing to segment a second image having a predetermined relationship with the first image, specifying foreground pixels, background pixels and undetermined pixels of the second image in the image, by using the segment information acquired in the boundary position acquisition processing, wherein the segmentation control processing determines an area in which a predetermined width in accordance with the relationship between the first image and the second image is provided for a boundary line between the foreground pixels and the background pixels determined by the segment information, specifies an area in the second image corresponding to the determined area as undetermined pixels, and controls the segmentation processing to segment the second image.

14. A non-transitory computer-readable storage medium having stored thereon a program that is executable by a computer, the program being executable by the computer to perform functions comprising:

segmentation processing for, when foreground pixels determined to be a foreground, background pixels determined to be a background, and undetermined pixels that remain undetermined as to whether they are a foreground or a background are designated in an image, further segmenting the undetermined pixels into foreground pixels and background pixels based on designation information;

segment information acquisition for acquiring segment information for a case in which a first image is segmented into foreground pixels and background pixels in the segmentation processing; and segmentation control for, when controlling the segmentation processing to segment a second image having a predetermined relationship with the first image, specifying foreground pixels, background pixels, and undetermined pixels of the second image in the image, by use of the segment information acquired in the segment acquisition, wherein the segmentation control determines an area in which a predetermined width in accordance with the relationship between the first image and the second image is provided for a boundary line between the foreground pixels and the background pixels determined by the segment information, specifies an area in the second image corresponding to the determined area as undetermined pixels, and controls the segmentation processing to segment the second image.

* * * * *